US007340543B2

(12) United States Patent
Benninger

(10) Patent No.: US 7,340,543 B2
(45) Date of Patent: Mar. 4, 2008

(54) DEVICE AND METHOD FOR DISCRETE SIGNAL CONDITIONING

(75) Inventor: David C. Benninger, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 109 days.

(21) Appl. No.: 10/668,235

(22) Filed: Sep. 24, 2003

(65) Prior Publication Data

US 2005/0066084 A1 Mar. 24, 2005

(51) Int. Cl.
*G06F 13/12* (2006.01)

(52) U.S. Cl. ........................... 710/62; 710/63; 710/64; 710/65; 710/69

(58) Field of Classification Search ............. 710/62–65
See application file for complete search history.

(56) References Cited

U.S. PATENT DOCUMENTS

| | | | | |
|---|---|---|---|---|
| 3,744,028 | A | 7/1973 | Kirk | |
| 3,829,842 | A | 8/1974 | Langdon et al. | |
| 4,021,783 | A | 5/1977 | Highberger | |
| 4,172,280 | A | 10/1979 | Spiesman | |
| 4,339,794 | A | 7/1982 | Hideshima et al. | |
| 4,437,152 | A | 3/1984 | Jones | |
| 4,490,775 | A | 12/1984 | Quan | |
| 4,996,688 | A | 2/1991 | Byers et al. | |
| 5,233,501 | A | 8/1993 | Allen et al. | |
| 5,548,510 | A * | 8/1996 | Ebert et al. | 710/63 |
| 5,766,027 | A * | 6/1998 | Fogg | 439/76.1 |
| 5,947,748 | A | 9/1999 | Licht et al. | |
| 6,241,099 | B1 * | 6/2001 | Hendrickson et al. | 209/542 |
| 6,304,934 | B1 * | 10/2001 | Pimenta et al. | 710/62 |
| 6,392,557 | B1 * | 5/2002 | Kreuter | 340/825.22 |
| 6,448,914 | B1 | 9/2002 | Younis et al. | |
| 6,513,068 | B1 * | 1/2003 | Jones et al. | 709/236 |
| 6,715,139 | B1 * | 3/2004 | Kodosky et al. | 717/125 |
| 6,831,926 | B1 * | 12/2004 | Kinstler | 370/467 |
| 6,868,462 | B2 * | 3/2005 | Kolodziej | 710/62 |
| 2002/0032826 | A1 | 3/2002 | Massie et al. | |
| 2003/0074489 | A1 * | 4/2003 | Steger et al. | 710/1 |
| 2005/0102199 | A1 * | 5/2005 | Lee | 705/27 |

OTHER PUBLICATIONS

National Instruments, Labview Quickstart Guide, Feb. 1999, National Instruments, Feb. 1999 Edition, 1-1 through 4-9.*

* cited by examiner

*Primary Examiner*—Alan S. Chen
(74) *Attorney, Agent, or Firm*—Michael Best & Friedrich, LLP

(57) ABSTRACT

A circuit card assembly provides signal conditioning for signal discretes in control systems integrating a legacy, distributed processing architecture and a distributed I/O control system. Signal conditioning functions are determined, and the necessary physical circuits to perform the signal conditioning functions are incorporated into a circuit card. The Integrated Signal Conditioning Circuit Card Assembly is installed within the control system between legacy controllers and distributed I/O modules. The Integrated Signal Conditioning Circuit Card Assembly may leave any discrete signal unaltered or otherwise condition discretes with interrupt, interrupt on demand, over-ride, and monitor circuits. The centralized processor accesses and controls the conditioned discretes transmitted over a common hardware connection for use in system feedback and control.

22 Claims, 3 Drawing Sheets

DEVICE AND METHOD FOR DISCRETE SIGNAL CONDITIONING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to devices, systems, and processes useful for signal conditioning.

2. Brief Description of the Related Art

Control systems automate our world. From assembly lines to home heating and cooling systems, sensors detect various conditions, and report those conditions with discrete signals to a controller. The controller is programmed to keep the system running by feeding back commands determined by the various signals it receives. The processor feeds command signals back to controllers to operate equipment that perform work. Input/Output (I/O) devices feed information between sensors and controllers. To send discrete signals back and forth through the system, signal conditioning must be performed.

One problem found in control system design is integrating different discrete signal formats. Many different types of sensors may be used in a system. For example, a mail processing system may have optical character recognition scanners, and scales, along with other types of sensors, to sort mail. These sensors are manufactured by different companies, and have different discrete signal formats. Thus, the problem of integrating discrete signal formats is continuously present in control systems.

Another problem in designing control systems is encountered when bridging the gap between existing, or legacy, technology, and current computer architecture. Particularly, control systems have moved towards a distributed architecture, where a single controller controls signal discretes ("discretes") that are distributed along a common FieldBUS (Device-Level Network). Legacy systems typically have several central processing units (CPUs) controlling various subsystems and accessing discrete signals locally, with a custom format, rather than a common architecture. Increased performance of CPU's has enabled and driven the migration towards distributed I/O systems. If the legacy system cannot be interfaced with a distributed system, the user is faced with purchasing and testing a completely new automation system. This complete replacement is often too costly and time consuming to be feasible.

Discrete signals must be conditioned when interfacing the legacy and distributed systems. If the signals are compatible, the discrete may be left alone. Otherwise, the discrete may need to be interrupted, redirected, or over-ridden. In current systems, conditioning legacy discretes has typically been approached in two ways. One approach has been to place a communications link between the legacy controller and the distributed system controller, and allow this new controller to make requests from the legacy system. This approach, however, does not give the distributed system real-time control. Another approach to conditioning legacy discretes has been to alter the existing hardware, effectively generating a new discrete signal format. This approach, however, again requires custom alteration to the existing system, requiring testing and equipment replacement.

Various devices, systems and methods are known for conditioning signals in control systems. U.S. Pat. No. 6,392,557 to Kreuter, issued May 21, 2002, describes an output over-ride board 10 releasably mounted to a programmable logic controller 12 (PLC) that controls an output of the PLC 12. The over-ride board is particularly used for over-riding the output signal from a PLC so that the PLC can be modified at the installation sight (col. 4, 11. 23-28.)

U.S. Pat. No. 5,947,748 to Licht, et al., issued Sep. 7, 1999, for a connector to a PLC. The interface connector board 16 evenly distributes thermocouple wires providing input to the PLC. A plurality of dielectrically isolated interconnection points permits the user to custom design components used for signal conditioning (col. 3, 11. 5-30).

Although prior systems, methods, and devices generally functioned well and provided advantages over prior systems, methods, and devices, they do not provide a simple, efficient, and cost-effective manner of conditioning legacy discrete signals interfaced with a distributed system architecture.

SUMMARY OF THE INVENTION

A circuit card assembly provides signal conditioning for signal discretes in control systems integrating a legacy, distributed processing architecture and a distributed I/O control system. Signal conditioning functions are determined, and the necessary physical circuits to perform the signal conditioning functions are incorporated into a circuit card. The Integrated Signal Conditioning Circuit Card Assembly is installed within the control system between legacy controllers and distributed I/O modules. The Integrated Signal Conditioning Circuit Card Assembly may leave any discrete signal unaltered or otherwise condition discretes with interrupt, interrupt on demand, over-ride, and monitor circuits. The centralized processor accesses and controls the conditioned discretes transmitted over a common hardware connection for use in system feedback and control.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
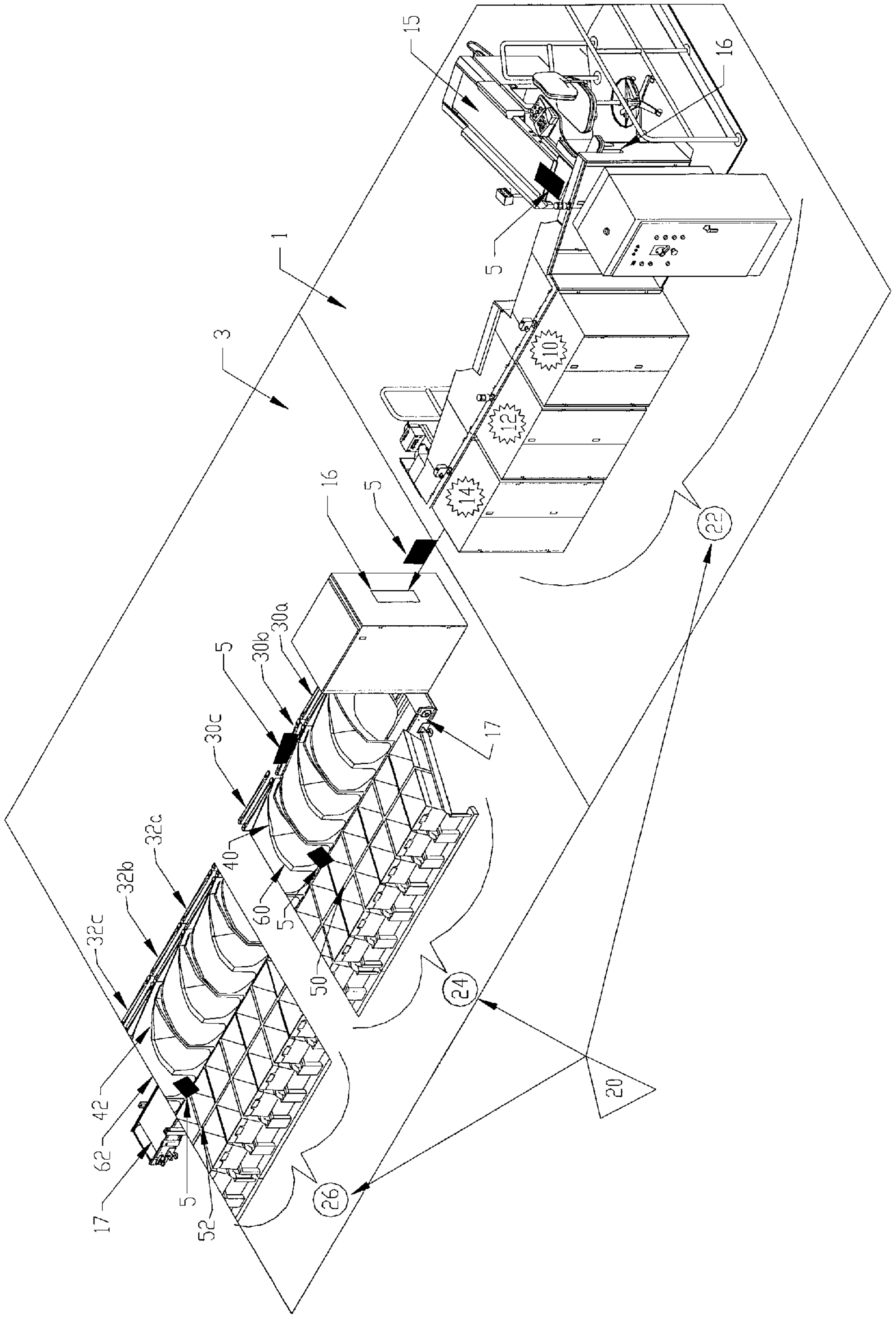
FIG. 1 illustrates an exemplary physical environment having integrated legacy and distributed I/O systems in accordance with the present invention.

Referring to the drawing figures, like reference numerals designate identical or corresponding elements throughout the several figures.

FIG. 1 illustrates an exemplary physical environment having integrated legacy and distributed I/O systems in accordance with the present invention. Particularly, FIG. 1 illustrates a portion of a flat mail sorting system. Flat mail 5 is placed on a conveyor belt 15 for processing. In the processing area 1, various subsystems, 10, 12, 14 are utilized to read or detect different types of information about each flat 5. Subsystem 10 determines the size of each flat 5. Subsystem 12, an optical character recognition (OCR) scanner, reads the zip code for each flat 5. Subsystem 14, a weighing system, determines the weight of each flat 5. Subsystems 10, 12 and 14 have components, which are not otherwise illustrated in FIG. 1, and report their information to the Master CPU 20. It will be appreciated by one of skill in the art that the subsystems and parallel subsystems which gather information used to process the flats 5 may be constructed in a variety of ways, and illustrate sources of various discrete signals.

The Master CPU 20 is electrically connected to the various subsystems 10, 12, 14 and to the legacy controllers 22, 24, 26. The Master CPU 20 runs the control system and has sufficient flash memory to store instructions when the system is powered down. When the system is powered up, the Master CPU 20 downloads high-level instructions to each legacy controller 22, 24, 26. During system operation, subsystems 10, 12, 14 transmit data read for sorting flats 5 to the Master CPU 20.

Flats 5 are transferred from the processing area 1, to the sorting area 3 via the mail transport mechanism 16. In the sorting area, mail diverters 30*a*, 30*b*, 30*c*, 32*a*, 32*b*, 32*c* can either transport the flats 5 downstream or divert the flats 5, as illustrated by diverter 30*b*, for sortation. Swivels 40, 42 are connected to chutes 60, 62 that direct flats 5 into trays 50, 52 for eventual transfer onto take-away conveyor 17.

Diverters 30*a*, 30*b*, 30*c*, 32*a*, 32*b*, 32*c*, re-position flats 5 as operated by legacy controllers 24, 26 when flats are in the sorting area 3. As a flat 5 moves along the transport 16, the information detected by the subsystems 10, 12 and 14 in the processing area 1, are transmitted to various processors (further described below) that control the sorting system. For example, all flats 5 weighing less than 5 ounces and going to zip code 22314 may belong in tray 50. The controller 24 for diverter 30*b* is signaled to operate diverter 30*b* to sort flat 5 off the transport 16. At the same time, the controller 24 activates swivel 40 to open chute 60, allowing the flat 5 to enter chute 60 and fall into its proper tray 50. Each legacy controller 22, 24, & 26 is given high-level instructions regarding activities to take place in their sections from the Master CPU 20. As different actions along the sorting or processing areas happen, control signals are received and sent between sensors and controllers to provide information about and operate the system.

Figure 2:
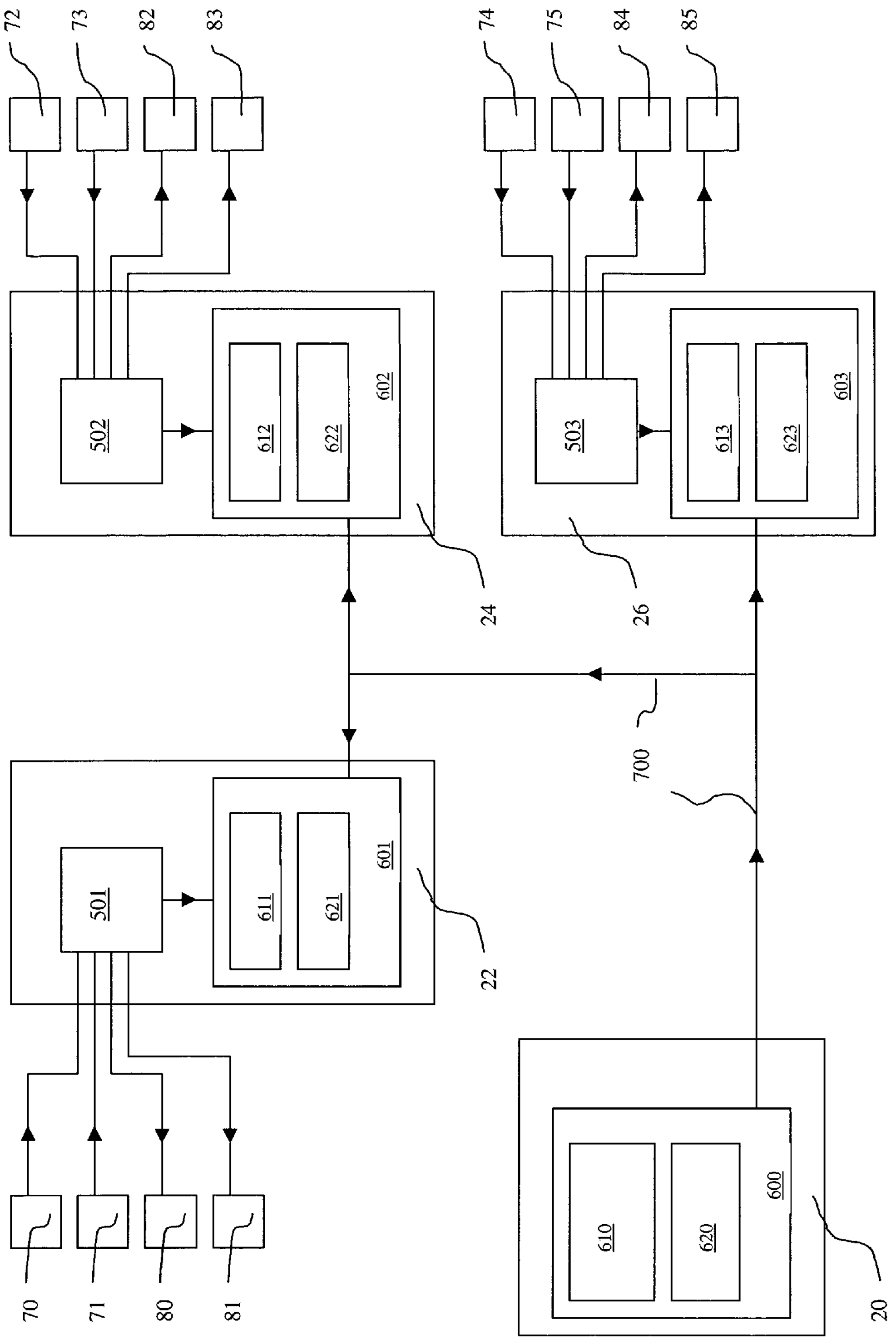
FIG. 2 illustrates an exemplary control system schematic for processing discrete signals in accordance with the present invention.

Referring to FIG. 2, an exemplary control system schematic for processing discrete signals in accordance with the present invention is illustrated. For clarity, legacy controllers 22, 24, 26 and the Master CPU 20 are illustrated with major subcomponents. Legacy I/O Cards 501, 502, 503 process discrete I/O signals. CPU's 601, 602, 603 contain other processing components, such as hardware, e.g., processors 611, 612, 613 and memory modules 621, 622, 623 and software (not shown) stored in memory modules 621, 622, 623 and executable by the processors 611, 612, 613. The legacy controllers 22, 24, 26 receive their executable software and high-level instructions from the Master CPU 20, through communications network 700. Communications network 700 is preferably a fiber-optic or other modem high-speed communications network. The executable software operates a portion of the control system. Distributed CPU's 601, 602, 603 execute their software based on discrete signal information received from sensors 70, 71, 72, 73, 74, 75 sensing various conditions along the mail processing system. Likewise CPU's 601, 602, 603 drive output devices 80, 81, 82, 83, 84, 85 to cause physical changes in the mail processing system, such as the diverting of a particular flats mail piece into a particular tray. In the system of FIG. 1, the software operates the sorting area 3 and processing area 1 through legacy controllers 22, 24, 26. Legacy I/O Cards 501, 502, 503 receive and/or energize discrete I/O signals coming from and going to the legacy system. The signal format, for each discrete, has been defined by the manufacturer of the sensor.

The Legacy I/O Cards 501, 502, 503 are designed and manufactured according to the type of discrete signals to be processed. One of skill in the art determines the type of signal conditioning function needed to convert the discrete to the proper format for the distributed architecture. The Legacy I/O Cards 501, 502, 503 accept legacy input signals and transmit legacy output signals through pinned connectors and wires, as known by one of ordinary skill in the art. Preferably, the Legacy I/O Cards 501, 502, 503 operate on a direct current format. It will be appreciated that other formats may be accommodated. Preferably, from 5 to 30 volt direct current format, or less than 250 volts alternating current. By accepting and conditioning the legacy discretes having different signal formats, The Legacy I/O Cards 501, 502, 503, provide an opportunity for the legacy controllers to operate compatibly with a new distributed I/O processing architecture. For example, where a legacy system sensor monitors the position of a mail diverter, and a controller in a modern distributed I/O tray handling system needs to read the same signal providing status of the diverter, one of ordinary skill would determine that a monitor circuit would be needed to interface the legacy signal to the modern distributed I/O tray handling system. Once the design determination is made, an Integrated Signal Conditioning Circuit Card Assembly may now be manufactured to accept and condition the discrete signal inputs.

Figure 3:
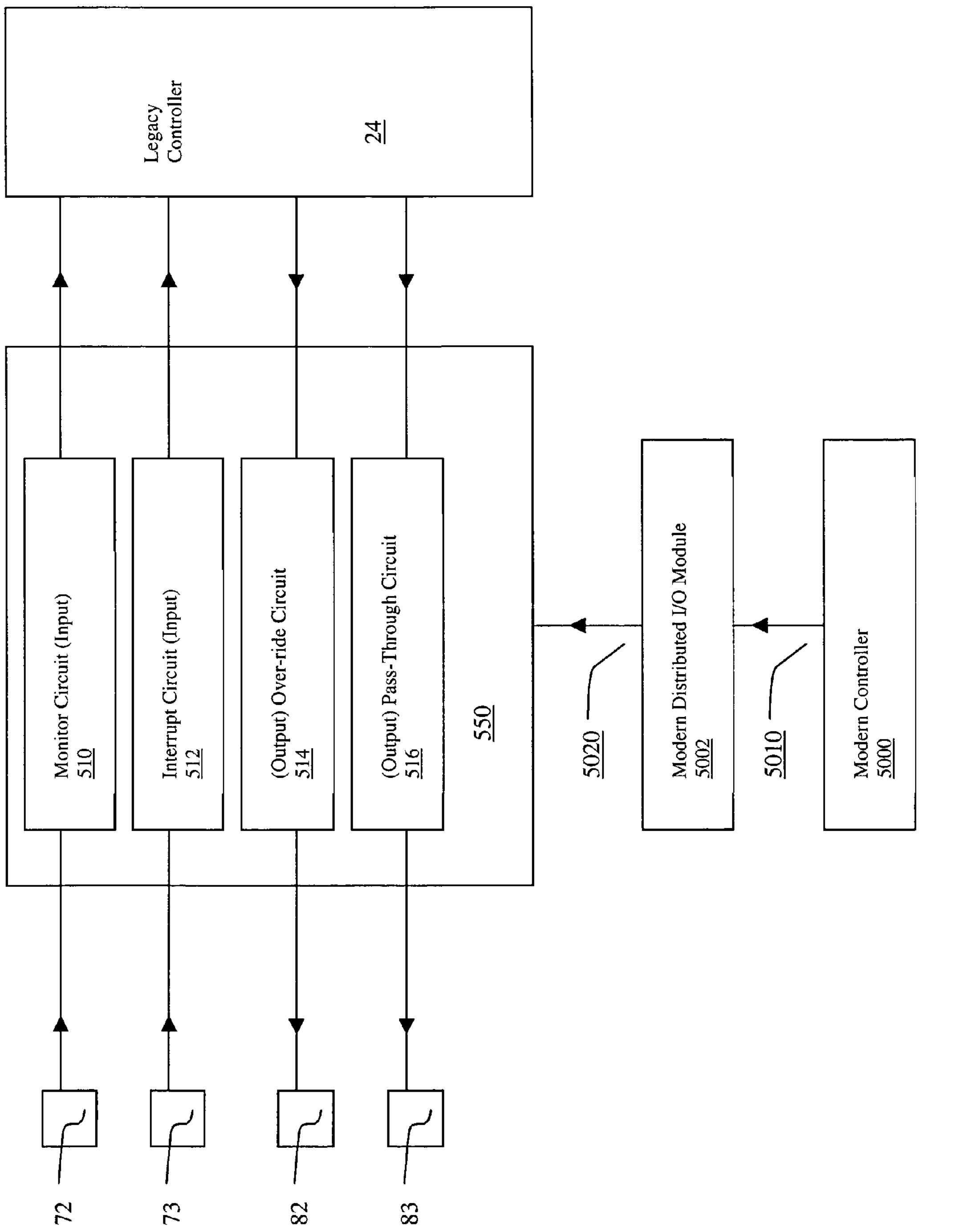
FIG. 3 illustrates a preferred embodiment of an integrated signal conditioning circuit card assembly interfacing a legacy and a distributed I/O system in accordance with the present invention.

Referring to FIG. 3, a preferred embodiment of a signal conditioning circuit card assembly interfacing a legacy and a distributed I/O system in accordance with the present invention is illustrated. For example, the mail processing/sorting equipment of FIG. 1 is integrated with a modern system which utilizes a distributed I/O architecture. A modern controller 5000, in this case a single PC, controls a high number of I/O from a number of distributed I/O modules via a FieldBUS network, i.e., a device-level network. However, for clarity, the system is illustrated with a single I/O module. Modern Controller 5000 connects to a Modern Distributed I/O module 5002 via FieldBUS 5010. A variety of discrete I/O signals, from legacy controller 24, are routed through the Integrated Signal Conditioning Circuit Card Assembly 550. Other legacy controllers along the mail processing or sorting areas are similarly integrated with the modern controller 5000. Modern distributed I/O Module 5002 receives instructions from Modern Controller 5000 and transmits back sensor status through the FieldBUS 5010. The Modern Distributed I/O Module is hardwired to the Integrated Signal Conditioning Circuit Card Assembly 550 via cable 5020. It will be appreciated that the Integrated Signal Conditioning Circuit Card Assembly 550 can be integrated with the legacy discrete signals in a variety of ways. Preferably, the Integrated Signal Conditioning Circuit Card Assembly 550 is installed in a spare card chassis in the legacy controller 22, 24, 26.

Discrete signals 72, 73, 82, 83 originate from legacy controller 24 (as illustrated in FIG. 2). The Integrated Signal Conditioning Circuit Card assembly 550, which is hard-wired into the legacy system, affects signal discretes as designed. As illustrated, signal 72, is monitored by a monitor circuit 510. Any data the signal previously provided the legacy controller 24 is now available to the Modern Controller 5000. Signal 73 is interrupted when needed by an interrupt circuit 512. The Modern Controller 5000 provides instructions for when data previously available to legacy controller 24 via Discrete Input Signal 73 may be interrupted. Signal 82 may be over-ridden by an over-ride circuit 514. Modern Controller 5000 provides instructions for when action dictated by legacy controller 24 may be taken over. Signal 83 is allowed to pass through by a pass-through circuit 516, and is unaffected by the Integrated Signal Conditioning Circuit Card Assembly 550.

In the exemplary mail sorting system illustrated in FIG. 1, the Modern controller 5000 and Modern Distributed I/O Module 5020 are part of an over-all modern control system that detects when a tray is full of flats, and exchanges the full tray for the next empty tray. In order to do so, the modern system must be able to monitor the state of mail diverters, interrupt legacy controllers' ability to sort mail while a tray is exchanged, over-ride the tray take-away conveyor to remove the tray, and pass through the signal that energizes the transport while a tray is loaded. The Signal-Conditioning Circuit Card Assembly 550 has been manufactured to condition the discrete signals 72, 73, 82, 83 to fit into the distributed I/O architecture. As illustrated, one of ordinary skill in the art would determine that a monitor circuit 510, an interrupt circuit 512, an over-ride circuit 514, and a pass-through circuit 516 are needed to condition these discretes 72, 73, 82, 83. Particularly, when tray 50 is being moved, the monitor circuit 510 indicates that the diverter 30*b* is inactive. The override circuit 514 allows the modern control system to control the tray take away conveyor 17. The pass-through circuit 516 allows the legacy controller 24 to maintain control of the mail transport 16 until a replacement tray has been loaded.

It will be appreciated by one of ordinary skill in the art that signal-conditioning circuits are well-known, and a variety of circuit types and structures may be used to format signals within an Integrated Signal Conditioning Circuit Card Assembly without departing from the scope of the present invention. For example, monitor, interrupt, interrupt-on-demand, over-ride, and pass-through functions can be provided as constants or on-demand by altering the conditioning circuit structure. Further, though a specific number of discrete signals are illustrated in the exemplary embodiment, it will be appreciated by one of ordinary skill in the art that the Integrated Signal Conditioning Circuit Card Assembly of the present invention may be manufactured to accept as many discrete signals as can be contained on a circuit card. Preferably, the Integrated Signal Conditioning Circuit Card Assembly accepts between 1-32 discrete signals, and more preferably, 32 discrete signals. However, it will be appreciated by one of ordinary skill in art that circuit cards may be fabricated for conditioning more than 32 discretes. Conditioned signals are then available to the new control system for further processing and control. The legacy controller continues to provide feedback to the Master CPU through the communications network for system operation, not necessarily even aware of the discrete signal conditioning that has taken place.

While the control system illustrates a single signal conditioning circuit card assembly associated with each legacy controller, it will be appreciated by one of ordinary skill in the art that multiple signal conditioning circuit card assemblies can be incorporated into each CPU to accommodate multiple signal formats. Likewise, multiple Integrated Signal Conditioning Circuit Card Assemblies may be used, throughout legacy control system architectures, in accordance with the present invention.

While the present invention is described in the context of a mail sorting system, it will be appreciated by one of ordinary skill in the art that an Integrated Signal Conditioning Circuit Card Assembly in accordance with the present invention may be used in any type of control system environment.

While the invention has been described in detail with reference to preferred embodiments thereof, it will be apparent to one skilled in the art that various changes can be made, and equivalents employed, without departing from the scope of the invention.

What is claimed is:

1. A circuit card assembly connectable to a system, the circuit card assembly comprising:

a plurality of system connections;

circuitry coupled to the plurality of system connections and capable to receive a plurality of signals from the plurality of system connections, the circuitry including monitoring circuitry capable to receive one of the plurality of signals, and to generate a monitor signal based on the signal received by the monitoring circuit;

interrupt circuitry capable to receive one of the plurality of signals, and to interrupt the signal received by the interrupt circuitry;

override circuitry capable to receive one of the plurality of signals, and to override the signal received by the override circuitry with an override signal; and pass-through circuitry capable to receive one of the plurality of signals, and to pass the signal received by the pass-through circuitry.

2. The circuit card assembly of claim 1, wherein each of the plurality of signals, the override signal, and the monitor signal has an analog, direct current format.

3. The circuit card assembly of claim 1, wherein each of the plurality of signals, the override signal, and the monitor signal has a 5 to 30 volts, analog, direct current format.

4. The circuit card assembly of claim 1, wherein each of the plurality of signals, the override signal, and the monitor signal has an analog, alternating current format.

5. The circuit card assembly of claim 1, wherein each of the plurality of signals, the override signal, and the monitor signal has an analog, alternating current format of less than 250 volts.

6. The circuit card assembly of claim 1, wherein at least one of the plurality of signals, the override signal, and the monitor signal has an analog, alternating current format of less than 250 volts, and wherein at least one of the plurality of signals, the override signal, and the monitor signal has a 5 to 30 volts, analog, direct current format.

7. The circuit card assembly of claim 1, wherein the monitoring circuitry, the interrupt circuitry, the override circuitry, and pass-through circuitry include a monitoring circuit, a interrupt circuit, an override circuit, and a pass-through circuit, respectively.

8. The circuit card assembly of claim 7, wherein the monitoring circuitry is further capable to receive the one of the plurality of signals from one of the plurality of system connections, and communicate the signal received by the monitoring circuitry to another of the plurality of system connections, wherein the interrupt circuitry is further capable to receive the one of the plurality of signals from one of the plurality of system connections, and communicate the signal received by the interrupt circuitry to another of the plurality of system connections when the interrupt circuitry does not interrupt the signal received by the interrupt circuitry, wherein the override circuitry is further capable to receive the one of the plurality of signals from one of the plurality of system connections, communicate the signal received by the override circuitry to another of the plurality of system connections when the override circuitry does not override the signal received by the override circuitry, and communicate the override signal to the another of the plurality of system connections coupled to the override circuit when the override circuit overrides the signal received by the circuitry, and wherein the pass-through circuitry is further capable to receive the one of the plurality of signals from one of the plurality of system connections, and to pass the signal received by the pass-through circuitry to another of the plurality of system connections.

9. The circuit card assembly of claim 8, wherein the one of the plurality of signal connections for the monitoring circuitry, the one of the plurality of signal connections for the interrupt circuitry, the one of the plurality of signal connections for the override circuitry, and the one of the plurality of signal connections for the pass-through circuitry are respective system connections, and wherein the another of the plurality of system connections for the monitoring circuitry, the another of the plurality of signal connections for the interrupt circuitry, the another of the plurality of signal connections for the override circuitry, and the another of the plurality of signal connections for the pass-through circuitry are respective system connections.

10. A system comprising:

a device a controller;

a circuit card assembly including a first plurality of discrete connections, a second plurality of discrete connections, and a plurality of circuits, each of the plurality of circuits electrically coupling a respective one of the first plurality of discrete connections to a respective one of the second plurality of discrete connections, one of the first plurality of discrete connections being coupled to one of the device and the controller, and the respective one of the second plurality of discrete circuit connections being coupled to the other of the device and the controller, the plurality of circuits including a monitor circuit capable to receive a first signal and generate a monitor signal based on the first signal, an interrupt circuit capable to receive a second signal and interrupt the second signal, an override circuit capable to receive a third signal and to override the third signal with an override signal, a pass-through circuit capable to receive a fourth signal and to conduct the fourth signal through the pass-through circuit.

11. The system of claim 10, further comprising a second controller electrically coupled to the circuit card assembly, and wherein the second controller is capable of receiving a signal based on the monitor signal and of generating a signal having a relation to the override signal.

12. The system of claim 11, wherein the signal based on the monitor signal includes a discrete monitor signal, and the signal having a relation to the override signal includes a discrete override signal.

13. The system of claim 11, wherein the system includes a modified legacy system, wherein the first controller includes a legacy controller, and wherein the device includes a legacy input device.

14. The system of claim 10, wherein the first, second, third, fourth, override, and monitor signals are selected from a format consisting of an analog, alternating current format of less than 250 volts, and a 5 to 30 volts, analog, direct current format.

15. A method of operating on a plurality of signals of a system, the system including a circuit card assembly having at least eight system connections, the method comprising:

establishing the first, second, third, fourth, fifth, sixth, seventh, and eighth, system connections of the circuit card assembly;

receiving a first signal through the first system connection;

monitoring the first signal;

communicating the first signal through the second system connection;

receiving a second signal through the third system connection;

interrupting the second signal;

communicating the second signal through the fourth system connection based on an absence of the interrupting of the second signal;

receiving a third signal through the fifth system connection;

receiving an override signal;

overriding the third signal with the override signal;

communicating the third signal through the sixth system connection based on an absence of overriding the third signal;

communicating the override signal through the sixth system connection based on the overriding the third signal;

receiving a fourth signal through the seventh system connection; and communicating the fourth signal at the eighth system connection.

16. The method of claim 15, wherein the system includes a plurality of input and/or output devices, and a controller, and wherein establishing the system connections includes connecting one of the first system connection and the second system connection to the controller, connecting the other of the first system connection and the second system connection to a respective one of the plurality of input and/or output devices, connecting one of the third system connection and the fourth system connection to the controller, connecting the other of the third system connection and the fourth system connection to a respective one of the plurality of input and/or output devices, connecting one of the fifth system connection and the sixth system connection to the controller, connecting the other of the fifth system connection and the sixth system connection to a respective one of the plurality of input and/or output devices, connecting one of the seventh system connection and the eighth system connection to the controller, and connecting the other of the seventh system connection and the eighth system connection to a respective one of the plurality of input and/or output devices.

17. The method of claim 16 wherein the system includes a legacy system, wherein the controller includes a legacy controller.

18. The method of claim 16 wherein the system further includes a second controller, wherein the monitoring the first signal includes generating a monitor signal based on the first signal, and wherein the method further comprises communicating the monitor signal to the second controller.

19. The method of claim 16 wherein the system further includes a second controller, wherein the method further comprises communicating an interrupt signal from the second controller to the circuit card assembly, and wherein interrupting the second signal is based on the interrupt signal being communicated to the circuit card assembly.

20. The method of claim 16 wherein the system further includes a second controller, wherein the method further comprises communicating the override signal from the second controller to the circuit card assembly, and wherein overriding the second signal is based on the overriding signal being communicated to the circuit card assembly.

21. The method of claim 16 wherein the system further includes a second controller, wherein the monitoring the first signal includes generating a monitor signal based on the first signal, wherein the method further comprises communicating the monitor signal to the second controller, communicating an interrupt signal from the second controller to the circuit card assembly, and communicating the override signal from the second controller to the circuit card assembly, and wherein interrupting the second signal is based on the interrupt signal being communicated to the circuit card assembly, and wherein overriding the second signal is based on the overriding signal being communicated to the circuit card assembly.

22. The system of claim 15, wherein the first, second, third, fourth, override, and monitor signals are selected from a format consisting of an analog, alternating current format of less than 250 volts, and a 5 to 30 volts, analog, direct current format.

* * * * *